United States Patent
Fujita et al.

(10) Patent No.: US 10,168,604 B2
(45) Date of Patent: Jan. 1, 2019

(54) PROJECTION-TYPE DISPLAY DEVICE AND HEAT DISSIPATION METHOD

(71) Applicant: FUJIFILM Corporation, Tokyo (JP)

(72) Inventors: Koudai Fujita, Saitama (JP); Daisuke Ito, Saitama (JP); Kenji Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/468,387

(22) Filed: Mar. 24, 2017

(65) Prior Publication Data

US 2017/0199449 A1 Jul. 13, 2017

Related U.S. Application Data

(63) Continuation of application No. PCT/JP2015/063795, filed on May 13, 2015.

(30) Foreign Application Priority Data

Sep. 26, 2014 (JP) ................................ 2014-197215

(51) Int. Cl.
*G03B 21/16* (2006.01)
*H04N 9/31* (2006.01)
(Continued)

(52) U.S. Cl.
CPC .............. *G03B 21/16* (2013.01); *B60K 35/00* (2013.01); *G02B 27/0101* (2013.01);
(Continued)

(58) Field of Classification Search
CPC .. G03B 21/003; G03B 21/005; G03B 21/006; G03B 21/008; G03B 21/14; G03B 21/16;
(Continued)

(56) References Cited

U.S. PATENT DOCUMENTS

| 7,334,898 B2* | 2/2008 | Seto | ........................ | G03B 21/16 348/E5.143 |
| 7,384,151 B2* | 6/2008 | Seki | ........................ | G03B 21/16 353/31 |

(Continued)

FOREIGN PATENT DOCUMENTS

| CN | 1667496 A | 9/2005 |
| JP | 8-314010 A | 11/1996 |

(Continued)

OTHER PUBLICATIONS

English translation of International Preliminary Report on Patentability issued in PCT/JP2015/063795, dated Mar. 29, 2016 (Form PCT/IPEA/409).

(Continued)

*Primary Examiner* — William C Dowling
(74) *Attorney, Agent, or Firm* — Birch, Stewart, Kolasch & Birch, LLP (57) ABSTRACT

A projection-type display device includes: R, G, and B light sources that emit light beams with different colors; a projection unit that projects light beams based on image information among light beams emitted from the light sources onto a projection screen; a heat sink that radiates heat generated from the R light source, which has a maximum change in light emission intensity relative to a change in temperature, among the light sources; and a heat sink that radiates heat generated from the G and B light sources and that has a surface area smaller than that of the heat sink. In a use state, the R light source is disposed on a side apart from the other light sources in a direction opposite to a direction of gravitational force.

14 Claims, 8 Drawing Sheets

(51) Int. Cl.
  *B60K 35/00* (2006.01)
  *G02B 27/01* (2006.01)
  *G03B 21/20* (2006.01)
  *G03B 29/00* (2006.01)
  *G03B 33/10* (2006.01)

(52) U.S. Cl.
  CPC ..... *G02B 27/0149* (2013.01); *G03B 21/2013* (2013.01); *G03B 21/2046* (2013.01); *G03B 29/00* (2013.01); *G03B 33/10* (2013.01); *H04N 9/3144* (2013.01); *B60K 2350/2052* (2013.01); *B60K 2350/2095* (2013.01); *G02B 2027/0112* (2013.01)

(58) Field of Classification Search
  CPC .... G04N 9/3144; H04N 9/3144; H04N 9/311; H04N 9/3102; H04N 9/3105; H04N 9/314
  USPC ........................ 353/30, 31, 52, 54, 57, 60, 61
  See application file for complete search history.

(56) References Cited

U.S. PATENT DOCUMENTS

| | | | |
|---|---|---|---|
| 8,226,244 B2 * | 7/2012 | Yamagishi | G03B 21/16 353/119 |
| 2005/0201107 A1 | 9/2005 | Seki | |
| 2013/0155113 A1 | 6/2013 | Kotani et al. | |
| 2014/0362347 A1 * | 12/2014 | Oel | G03B 21/608 353/13 |

FOREIGN PATENT DOCUMENTS

| | | |
|---|---|---|
| JP | 2003-161906 A | 6/2003 |
| JP | 2005-148694 A | 6/2005 |
| JP | 2005-257873 A | 9/2005 |
| JP | 2007-072392 A | 9/2005 |
| JP | 2007-178945 A | 7/2007 |
| JP | 2008-176338 A | 7/2008 |
| JP | 2011-197644 A | 10/2011 |
| JP | 2013-122490 A | 6/2013 |
| JP | 2013-146049 A | 7/2013 |
| JP | 2014-177217 A | 9/2014 |

OTHER PUBLICATIONS

International Preliminary Report on Patentability (PCT/IPEA/409) issued in PCT/JP2015/063795, dated Mar. 29, 2016.
International Search Report (PCT/ISA/210) issued in PCT/JP2015/063795, dated Jul. 21, 2015.
Written Opinion (PCT/ISA/237) issued in PCT/JP2015/063795, dated Jul. 21, 2015.
Chinese Office Action and Search Report, dated Jul. 3, 2018, for corresponding Chinese Application No. 201580051345.2, along with an English translation.

* cited by examiner

PROJECTION-TYPE DISPLAY DEVICE AND HEAT DISSIPATION METHOD

CROSS REFERENCE TO RELATED APPLICATION

This is a continuation of International Application No. PCT/JP2015/063795 filed on May 13, 2015, and claims priority from Japanese Patent Application No. 2014-197215 filed on Sep. 26, 2014, the entire disclosures of which are incorporated herein by reference.

BACKGROUND OF THE INVENTION

1. Field of the Invention

The present invention relates to a projection-type display device and a heat dissipation method.

2. Description of the Related Art

There are known head-up display (HUD) apparatuses for vehicles for projecting projection light beams on a screen, which is a combiner disposed on a front glass of a vehicle or in the vicinity of the front of the front glass, so as to display an image. Through such a HUD, a user is able to see an image, which is displayed on the front glass or the like through projection light beams projected from the HUD, in a state where the image is superimposed on a landscape of the front of own vehicle on the rear side of the front glass or the like.

A projection-type display device typified by a HUD is equipped with a plurality of light sources, which emit light beams with different colors, in order to perform image display.

For example, JP2013-122490A discloses a projection-type display device that is equipped with a light source that emits red light beams, a light source that emits green light beams, and a light source that emits blue light beams.

Further, JP2003-161906A discloses a HUD that is equipped with a light source that emits red light beams and a light source that emits green light beams.

SUMMARY OF THE INVENTION

In HUDs such as a HUD for a vehicle which can be used under bright environment, there may be a demand to achieve an increase in visibility by increasing a brightness of a displayed image. In particular, considering that a user is notified of abnormality such as failure or a user is notified of such an emergency situation as gasoline is insufficient, it is important to achieve improvement of visibility.

However, in a light source, in a manner similar to that of a semiconductor light source such as a light emitting diode (LED) or a semiconductor laser, a light emission intensity thereof mostly depends on a temperature thereof.

Hence, if the HUD is used under high temperature environment, a brightness of the displayed image is unlikely to be sufficiently increased. Further, if the light emission intensity of the light source is increased to increase the brightness of the displayed image, an amount of heat generation in the light source unit is also increased in accordance therewith. The light emission intensity is lowered by the increase in temperature due to the increase in amount of heat generation, it is difficult to sufficiently increase the brightness of the displayed image. Further, under environment where used electric power is restricted, it is difficult to increase the light emission intensity of the light source.

In JP2013-122490A and JP2003-161906A, a decrease in visibility due to dependency of the temperature of the light source is not considered.

The present invention has been made in consideration of the above-mentioned situation, and its object is to provide a projection-type display device that has a plurality of light sources which emit light beams with different colors and that is capable of sufficiently ensuring visibility of the displayed image regardless of usage environment.

A projection-type display device of the present invention comprises: a plurality of light sources that emit light beams with different colors; a projection unit that projects light beams based on image information among light beams emitted from the plurality of light sources onto a projection screen; a first radiation member that radiates heat generated from a first light source, which has a maximum change in light emission intensity relative to a change in temperature, among the plurality of light sources; and a second radiation member that radiates heat generated from a second light source, which is other than the first light source, among the plurality of light sources and that has a surface area smaller than that of the first radiation member. In a use state, the first light source is disposed on a side apart from the second light source in a direction opposite to a direction of gravitational force.

Provided is a heat dissipation method of a projection-type display device of the present invention having a plurality of light sources that emit light beams with different colors, and a projection unit that projects light beams based on image information among light beams emitted from the plurality of light sources onto a projection screen. The method comprises: causing the plurality of light sources to include a first light source, which has a maximum change in light emission intensity relative to a change in temperature, and a second light source which is other than the first light source, providing the first light source on a side apart from the second light source in a direction opposite to a direction of gravitational force in a use state, radiating heat, which is generated from the first light source, through a first radiation member, and radiating heat, which is generated from the second light source, through a second radiation member which has a surface area smaller than that of the first radiation member.

According to the present invention, the projection-type display device has the plurality of light sources which emit light beams with different colors. Thus, it is possible to sufficiently ensure visibility of the displayed image regardless of usage environment.

DESCRIPTION OF THE PREFERRED EMBODIMENTS

Hereinafter, embodiments of the present invention will be described with reference to drawings.

Figure 1:
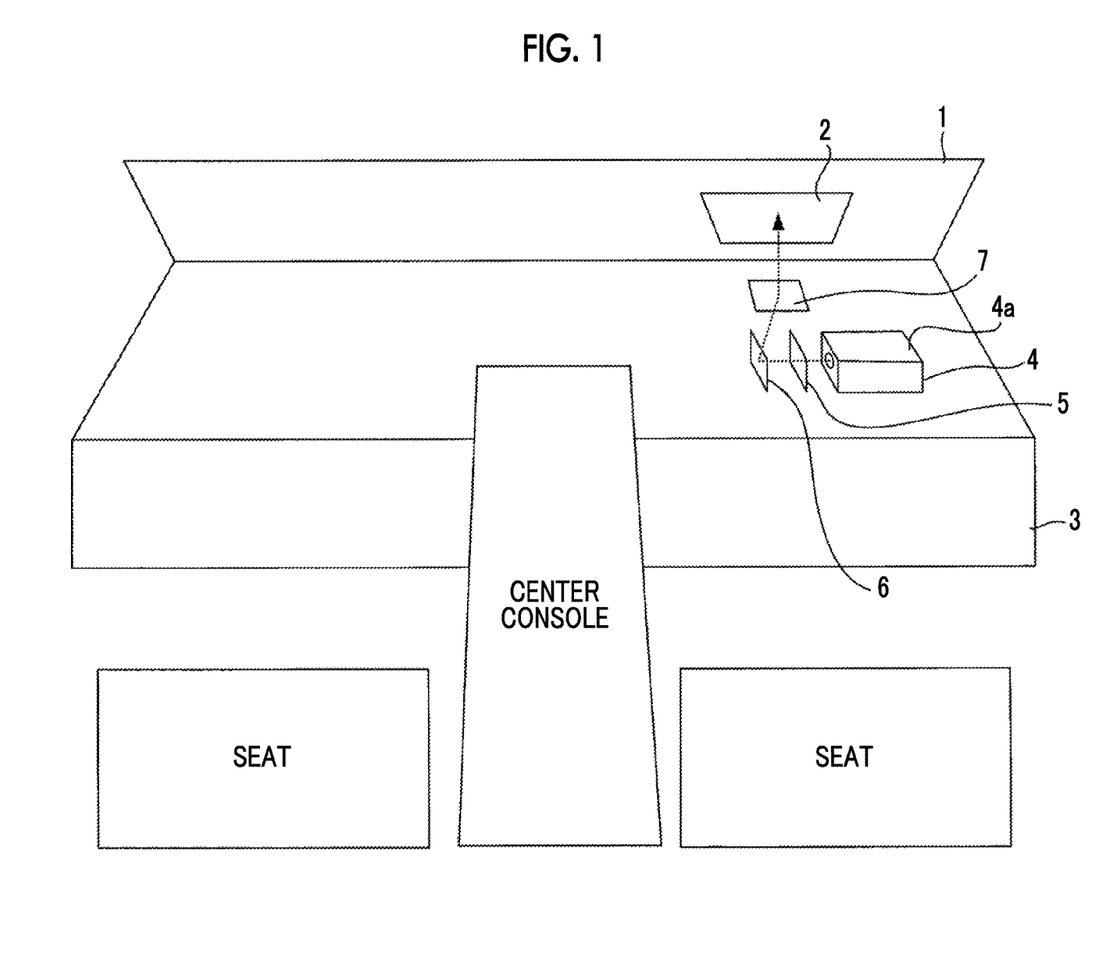
FIG. 1 is a schematic diagram illustrating a configuration of a HUD which is an embodiment of a projection-type display device of the present invention.

FIG. 1 is a schematic diagram illustrating a configuration of an on-board HUD which is an embodiment of a projection-type display device of the present invention.

The HUD shown in FIG. 1 comprises: a projection unit including a display unit 4 that is built into a dashboard 3 of a vehicle, a diffuser plate 5, a reflection mirror 6, and a magnifying glass 7; and a combiner 2 that is attached to the inner surface of the front glass 1 of the vehicle.

The diffuser plate 5 diffuses light, which is emitted from the display unit 4 and is based on image information, in order to make this light serve as a surface light source.

The reflection mirror 6 reflects the light, which is diffused through the diffuser plate 5, toward the magnifying glass 7.

The magnifying glass 7 magnifies an image, which is based on the light reflected by the reflection mirror 6, so as to project the image onto the combiner 2.

The combiner 2 is a projection screen onto which the light projected from the magnifying glass 7 is projected, and reflects the light. A driver of the vehicle is able to visually check information about driving by viewing the light reflected by the combiner 2.

Further, the combiner 2 has a function of reflecting the light projected from the magnifying glass 7 and transmitting the light incident from the outside (outer region) of the front glass 1. Hence, the driver is able to see an image, which is based on the light projected from the magnifying glass 7, and a landscape of the outer region outside the front glass 1.

The HUD shown in FIG. 1 is for a vehicle using a right-side steering wheel thereof. That is, the steering wheel for driving the vehicle is provided on the right seat. Consequently, the projection unit is built into the HUD on the right side of a center console within the dashboard 3.

Figure 2:
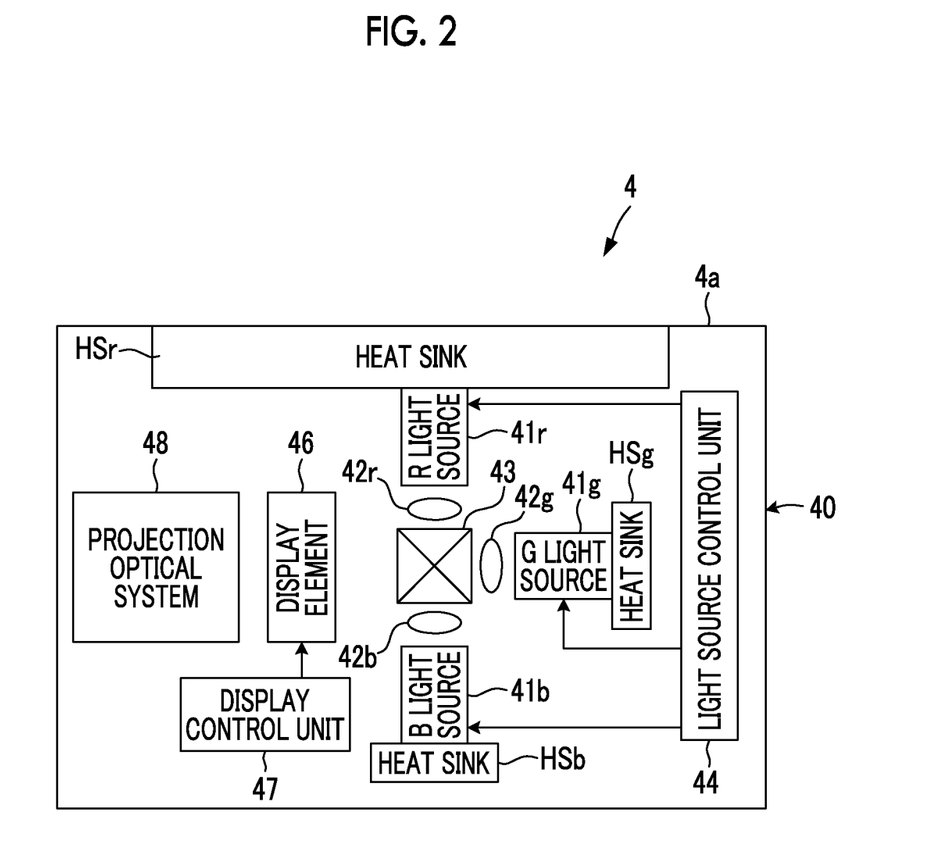
FIG. 2 is a diagram illustrating a configuration of a display unit 4 shown in FIG. 1.

FIG. 2 is a diagram illustrating an internal configuration of the display unit 4 shown in FIG. 1.

The display unit 4 comprises: a light source control unit 44; a plurality of light sources that emit light beams with different colors (in an example of FIG. 2, a R light source 41r that emits red light beams, a G light source 41g that emits green light beams, and a B light source 41b that emits blue light beams); a dichroic prism 43; a collimator lens 42r that is provided between the R light source 41r and the dichroic prism 43; a collimator lens 42g that is provided between the G light source 41g and the dichroic prism 43; a collimator lens 42b that is provided between the B light source 41b and the dichroic prism 43; a display element 46; a display control unit 47; a projection optical system 48; a heat sink HSr; a heat sink HSg; a heat sink HSb; and a casing 40 that houses the above-mentioned elements and has a substantially rectangular parallelepiped shape.

The R light source 41r, the G light source 41g, and the B light source 41b each employ a laser or a light emitting element such as a light emitting diode (LED).

Light emission intensities of the light emitting elements, which are used as the R light source 41r, the G light source 41g, and the B light source 41b, are lowered in accordance an increase in temperature.

For example, in a case of using LEDs as the light emitting elements, a decrease in light emission intensity of the R light source 41r relative to the increase in temperature is largest among those of the three light sources included in the display unit 4. Hereinafter, a description will be given under assumption that LEDs are used as the light emitting elements.

The HUD shown in FIG. 1 is used in a state where the display unit 4 including the R light source 41r, the G light source 41g, and the B light source 41b is incorporated into the dashboard 3. Therefore, the display unit 4 tends to have a higher temperature on the lower side in the direction of gravitational force (a direction in which gravitational force is applied, that is, a direction from the top to the bottom in FIG. 2).

Accordingly, in the HUD shown in FIG. 1, in a use state of the HUD, that is, in a state where the HUD is incorporated into the vehicle as shown in FIG. 1, the R light source 41r is disposed on a side (a side opposite to the direction of gravitational force) higher than the G light source 41g and the B light source 41b in the direction of gravitational force. That is, the R light source 41r, which has a maximum change in light emission intensity relative to the change in temperature, is disposed at a position where heat is least likely to have an effect thereon. Thereby, the light emission intensity of the R light source 41r is prevented from being lowered.

The B light source 41b is disposed to face toward the R light source 41r with the dichroic prism 43 interposed therebetween.

The G light source 41g is disposed on a side opposite to the light emission side of the dichroic prism 43.

The dichroic prism 43 is an optical member that guides light beams, which are respectively emitted from the R light source 41r, the G light source 41g, and the B light source 41b, into the same optical path. The optical member having such a function is not limited to the dichroic prism. For example, a cross dichroic mirror may be used.

The dichroic prism 43 reflects R light collimated through the collimator lens 42r, and emits the light to the display element 46. Further, the dichroic prism 43 transmits G light collimated through the collimator lens 42g, and emits the light to the display element 46. Furthermore, the dichroic prism 43 reflects B light collimated through the collimator lens 42b, and emits the light to the display element 46.

In addition, positions of the B light source 41b and the G light source 41g may be set to be opposite thereto. In a case of adopting arrangement shown in FIG. 2, a dichroic film provided on the dichroic prism 43 is easily fabricated. Thus, it is possible to minimize costs of manufacturing of the HUD.

The light source control unit 44 sets amounts of light beams, which are respectively emitted from the R light source 41r, the G light source 41g, and the B light source 41b, through a predetermined light emission pattern, and performs control to sequentially emit light beams through the predetermined light emission pattern from the R light source 41r, the G light source 41g, and the B light source 41b.

The display element 46 includes, for example, a liquid crystal display panel in which multiple liquid crystal display pixels having no color filters are two-dimensionally arranged. Under the control of the display control unit 47, the display element 46 controls transmittances of the respective liquid crystal display pixels in accordance with color components constituting the respective pixels of the image information to be displayed.

The display control unit 47 performs R transmittance control to adjust the liquid crystal display pixels to a transmittance corresponding to a red component in the image information, G transmittance control to adjust the liquid crystal display pixels to a transmittance corresponding to a green component in the image information, and B transmittance control to adjust the liquid crystal display pixels to a transmittance corresponding to a blue component in the image information.

The display control unit 47 performs the R transmittance control in synchronization with a time period in which the light source control unit 44 causes the R light source 41*r* to emit light. The display control unit 47 performs the G transmittance control in synchronization with a time period in which the light source control unit 44 causes the G light source 41*g* to emit light. The display control unit 47 performs the B transmittance control in synchronization with a time period in which the light source control unit 44 causes the B light source 41*b* to emit light.

Here, as an example, a configuration, in which the display element 46 and the display control unit 47 causes the display unit 4 to emit red image light, green image light, and blue image light in a time-division manner, is adopted. However, a known configuration for image projection used for a projector may be adopted.

For example, the light based on image information may be emitted to the outside by using a liquid crystal on silicon (LCOS), a digital mirror device (DMD), micro electro mechanical systems (MEMS), or the like.

The projection optical system 48 is an optical system for projecting the light, which is emitted from the display element 46 and is based on the image information, onto the diffuser plate 5. The projection optical system 48, the diffuser plate 5, the reflection mirror 6, and the magnifying glass 7 constitute a projection unit that projects the light, which is emitted from the display element 46 and is based on the image information, onto the combiner 2 as a projection screen.

In the example of FIG. 1, the direction of emission of light emitted from the display unit 4 is set as a direction toward a center console. However, this direction may be changed in accordance with the structure of the vehicle on which the HUD is mounted. For example, a configuration, in which light is emitted toward a window on the right seat, may be adopted.

The heat sink HSr is the first radiation member for radiating heat generated from the R light source 41*r*. The heat sink HSr is provided between the R light source 41*r* and a surface 4*a* facing toward the R light source 41*r* in the casing 40. The heat sink HSr may be provided at a position where the heat sink HSr radiates heat of the R light source 41*r*. For example, the heat sink HSr may be attached onto a rear surface of a substrate on which the R light source 41*r* is formed.

The heat sink HSg is the second radiation member for radiating heat generated from the G light source 41*g*. In the example of FIG. 2, the heat sink HSg is attached onto a rear surface of a substrate on which the G light source 41*g* is formed.

The heat sink HSb is the second radiation member for radiating heat generated from the B light source 41*b*. In the example of FIG. 2, the heat sink HSb is attached onto a rear surface of a substrate on which the B light source 41*b* is formed.

A part of the heat sink HSr contributing to radiation of heat has a surface area larger than those of the heat sinks HSg and HSb. The reason for this is that a decrease in light emission intensity of the R light source 41*r* relative to the increase in temperature is larger than those of the G light source 41*g* and the B light source 41*b*.

In the HUD configured as described above, in a use state, among three light sources, the R light source 41*r* is disposed at the highest position in the direction of gravitational force. Thereby, since heat is least likely to have an effect on the R light source 41*r*, even in a case where important information and the like are displayed in red, it is possible to prevent visibility of the important information from being lowered.

Further, the heat sink HSr for radiating heat generated from the R light source 41*r* is provided on the display unit 4. Thus, the surface area of the heat sink HSr is larger than the surface areas of the heat sinks HSg and HSb provided to correspond to other light sources. Hence, it is possible to prevent the light emission intensity of the R light source 41*r* from being lowered, and it is possible to prevent visibility of the important information from being lowered.

Figure 3:
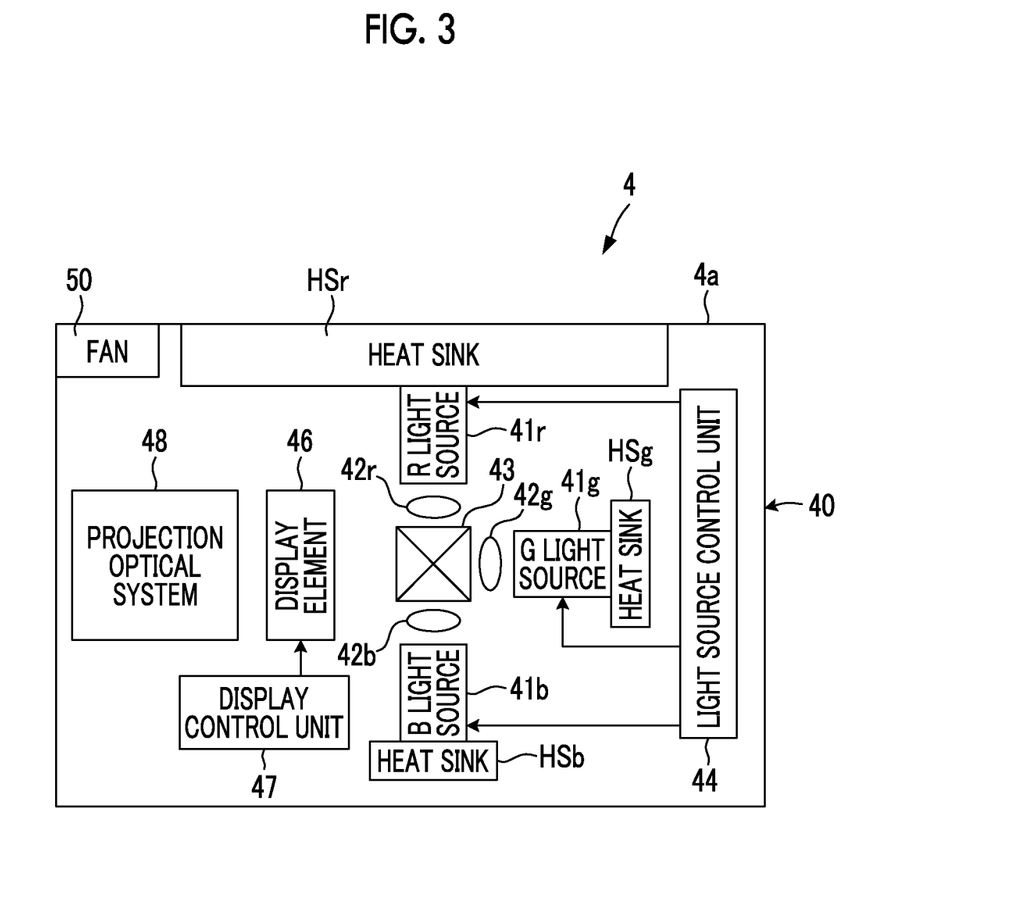
FIG. 3 is a diagram illustrating a first modification example of the display unit 4 shown in FIG. 2.

FIG. 3 is a diagram illustrating a first modification example of the display unit 4 shown in FIG. 2. A configuration of the display unit 4 shown in FIG. 3 is the same as the configuration shown in FIG. 2 except that a fan 50 is added in the casing 40.

The fan 50 is positioned to face toward the heat sink HSr, and functions as a cooling unit that cools the heat sink HSr down by discharging air around the heat sink HSr to the outside of the casing 40 through an opening portion provided on the casing 40.

According to the display unit 4 shown in FIG. 3, the heat sink HSr can be cooled down by the fan 50. Hence, it is possible to further suppress the increase in temperature of the R light source 41*r*, and it is possible to prevent visibility of the important information from being lowered.

Instead of the fan 50, only an opening portion may be positioned to face toward the heat sink HSr in the casing 40. In this configuration, heat of the heat sink HSr is discharged from this opening portion. Hence, this opening portion can be made to function as a cooling unit that cools the heat sink HSr down.

The fan 50 and the opening portion may be positioned to face toward the R light source 41*r*. In this configuration, it is also possible to suppress an increase in temperature of the R light source 41*r* by cooling the R light source 41*r* down.

In the on-board HUD, in a case of providing a fan, there is a possibility that a fan operation sound breaks stillness inside a vehicle which is running. However, as shown in FIG. 3, by providing the fan 50 ton only the R light source 41*r* or the heat sink HSr, it is possible to prevent visibility from being lowered while keeping an inside of a vehicle quiet. In the configuration in which the opening portion is provided instead of the fan, no fan operation sound occurs. Thus, this configuration is most preferable.

Figure 4:
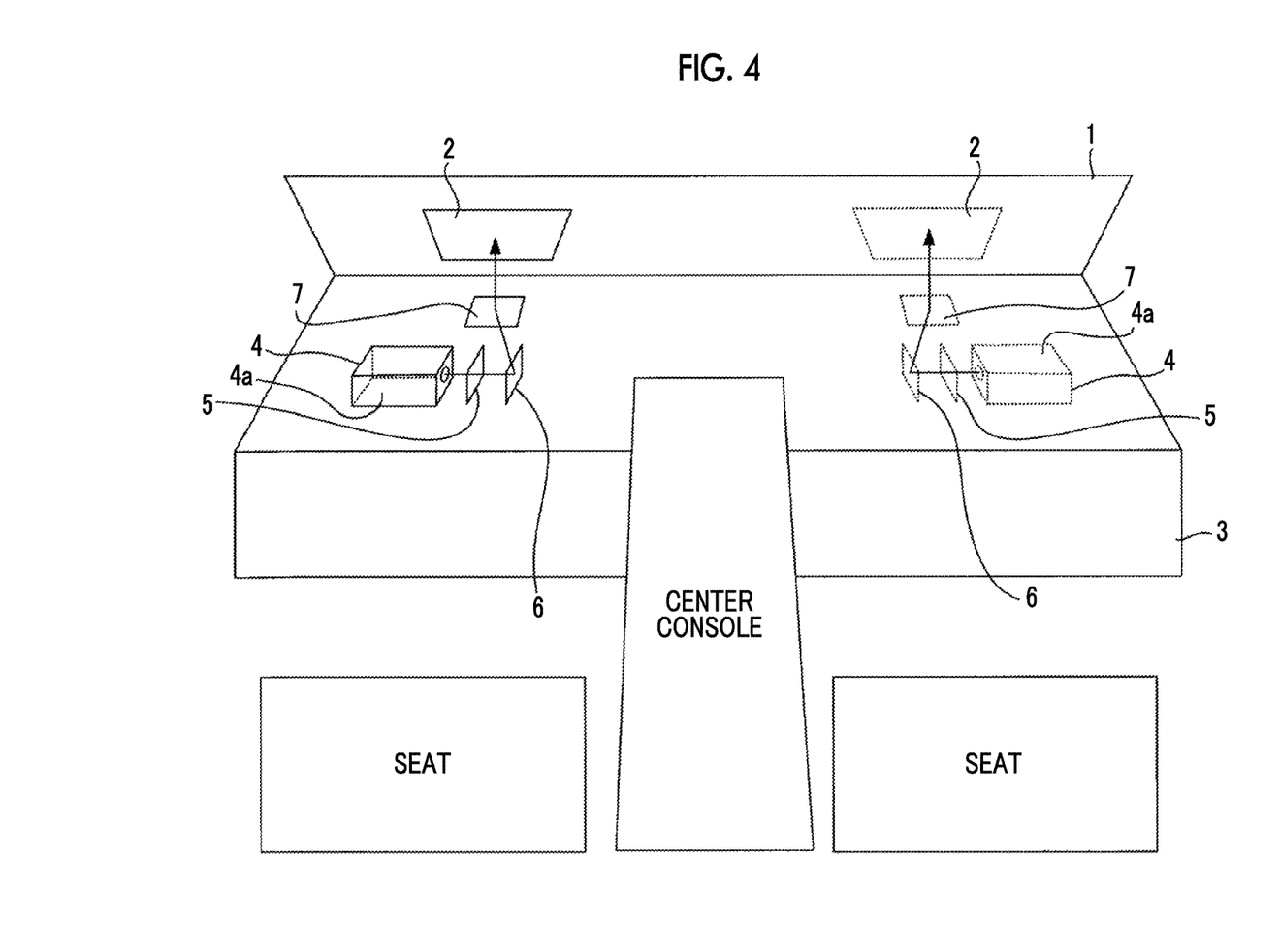
FIG. 4 is a diagram illustrating a configuration in which the HUD shown in FIG. 1 is applied to a vehicle using a left-side steering wheel thereof.

FIG. 4 is a diagram illustrating a configuration in which the HUD shown in FIG. 1 is applied to a vehicle using a left-side steering wheel thereof.

As shown in FIG. 4, in the vehicle of the left-side steering wheel, the diffuser plate 5, the reflection mirror 6, the magnifying glass 7, and the combiner 2 are respectively line-symmetric with respect to the center console.

In accordance with a type of a vehicle, there is not much space for wiring in the dashboard 3. FIG. 4 shows an example of a type of a vehicle in which it is necessary for a connection portion for wiring of the vehicle supplying power to the display unit 4 to be positioned toward a door side of the vehicle in terms of restriction in space.

If the display unit 4 is disposed to be line-symmetric with respect to the center console, the image, which is projected onto the combiner 2, may be inverted in the up down direction as compared with the vehicle using the right-side steering wheel, due to design of an optical system or the like. In this case, there is no problem as long as inverting processing is performed on the image displayed on the display element 46. However, it is necessary for different firmware to be used between the vehicle using the right-side steering wheel and the vehicle using the left-side steering wheel, and thus costs thereof increase.

Further, if the display unit 4 is disposed to be line-symmetric with respect to the center console, the position of the optical axis of the display unit 4 may be shifted as compared with the vehicle using the right-side steering wheel.

It is preferable that the display unit 4 is designed to be symmetric with respect to the optical axis in vertical and horizontal directions. However, in some cases, in terms of a casing size and restriction in arrangement of internal members, it may be difficult to realize the design. Even when the positions of the optical axes are the same in the up-down direction, the positions of the optical axes may not be the same in the left-right direction.

In such a case, if the display unit 4 is disposed to be line-symmetric with respect to the center console, the optical axis is shifted in the left-right direction.

Further, such a configuration as cooling means such as a heat sink is added on the side of the steering wheel of the casing 40 is considered. However, in this configuration, if the display unit 4 is disposed to be line-symmetric with respect to the center console, the cooling means is directed to the front window. In accordance with a type of a vehicle, there may be a vehicle having no space on the front window side. In this case, the line-symmetric arrangement may not be adopted.

In such a situation, in the vehicle using the left-side steering wheel, it is preferable that the display unit 4 is disposed in the dashboard 3 in a state where the display unit 4 is rotated by 180 degrees about the center line of the dashboard 3 such that the surface 4a of the casing 40 is on the lower side in the direction of gravitational force, as shown in FIG. 4.

However, if the display unit 4 is disposed as shown in FIG. 4, the R light source 41r is disposed at the lowest position in the direction of gravitational force. Hence, the temperature of the R light source 41r tends to increase, and visibility of red information is lowered.

Figure 5:
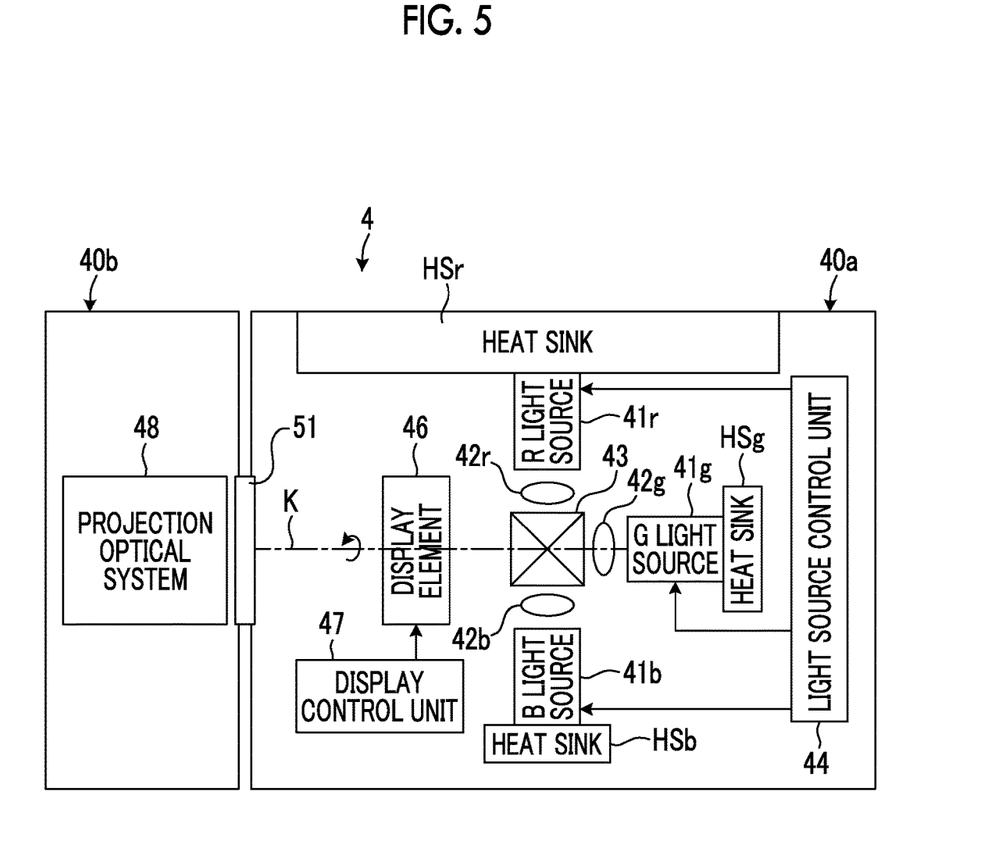
FIG. 5 is a diagram illustrating a second modification example of the display unit 4 shown in FIG. 2.

FIG. 5 is a diagram illustrating a second modification example of the display unit 4 shown in FIG. 2.

The display unit 4 shown in FIG. 5 is configured such that the casing 40 includes a housing unit 40b that houses the projection optical system 48 and a housing unit 40a that is connected to the housing unit 40b and houses components other than the projection optical system 48 shown in FIG. 2. The housing unit 40a is a housing unit that houses a plurality of light sources and optical members.

The display unit 4 shown in FIG. 5 has a rotation mechanism 51 that rotates the housing unit 40a around an optical axis K of the dichroic prism 43. The housing unit 40a is supported to be rotatable around the optical axis K relative to the housing unit 40b through the rotation mechanism 51.

Figure 6:
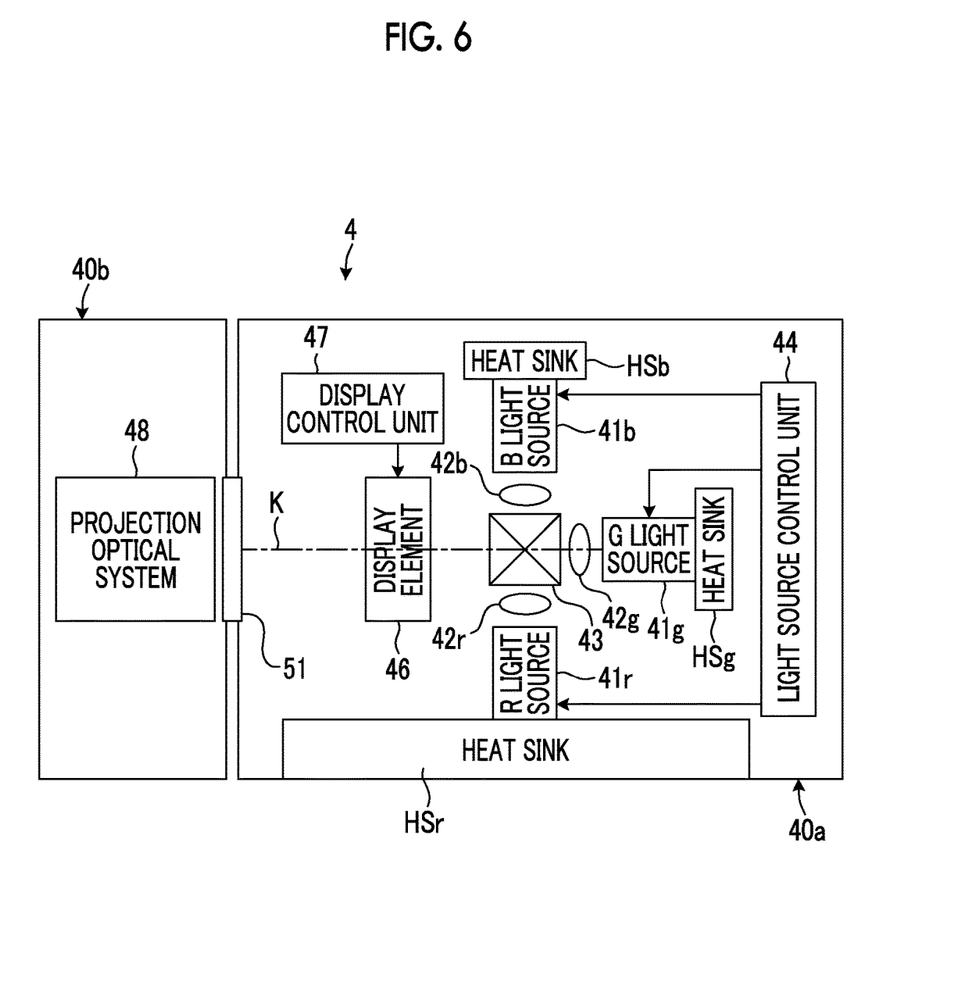
FIG. 6 is a diagram illustrating a state where a housing unit 40a of the display unit 4 shown in FIG. 5 is rotated by 180 degrees.

According to the display unit 4 shown in FIG. 5, it is possible to achieve the state shown in FIG. 6 by rotating the housing unit 40a around the optical axis K by 180 degrees, and the position of the R light source 41r can be inverted vertically in the direction of gravitational force.

Hence, if the display unit 4 is intended to be mounted on the vehicle using the left-side steering wheel, an operator changes the state of the display unit 4 shown in FIG. 5 to the state thereof shown in FIG. 6, and thereafter the display unit 4 is disposed such that the R light source 41r of the display unit 4 is placed on the upper side in the direction of gravitational force.

Thereby, in the use state, in the HUD, the R light source 41r is disposed on a side (a side opposite to the direction of gravitational force) higher than the other light sources in the direction of gravitational force. Thus, in a manner similar to that of the vehicle using the right-side steering wheel, it is possible to prevent the light emission intensity of the R light source 41r from being lowered.

Figure 7:
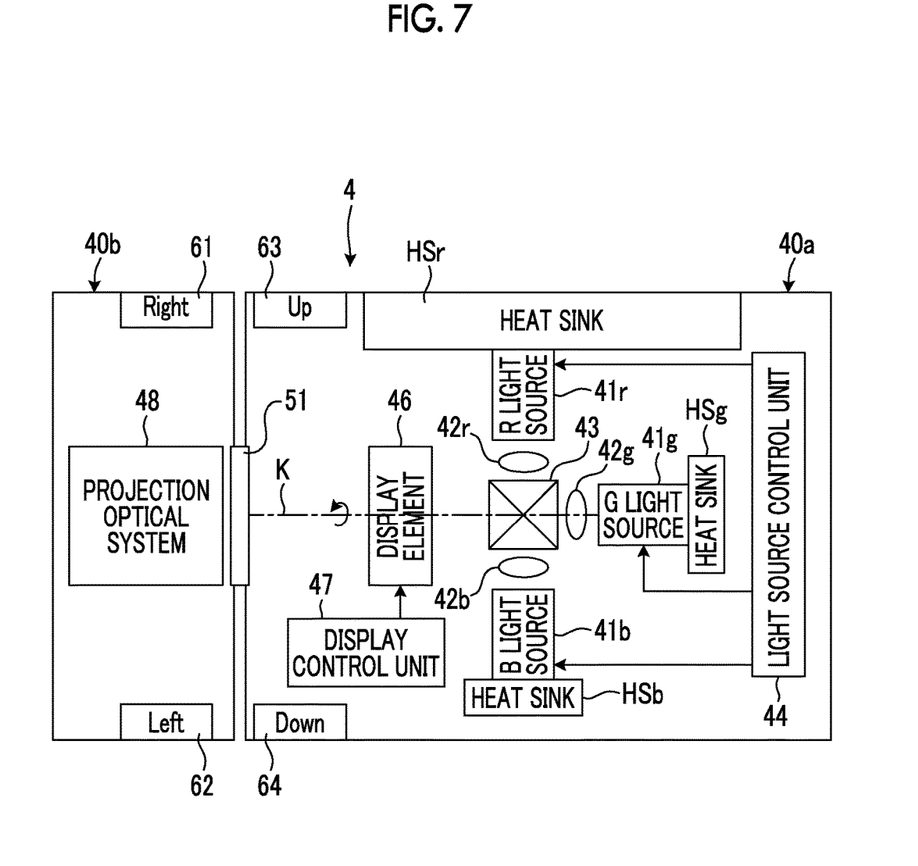
FIG. 7 is a diagram illustrating a modification example of the display unit 4 shown in FIG. 5.

FIG. 7 is a diagram illustrating a modification example of the display unit 4 shown in FIG. 5.

A configuration of the display unit 4 shown in FIG. 7 is the same as the configuration shown in FIG. 5 except that the following elements are added: a mark portion 61 that is formed on one side surface of the housing unit 40b in the direction of gravitational force in the use state; a mark portion 62 that is formed on the other side surface of the housing unit 40b in the direction of gravitational force in the use state; a mark portion 63 that is formed on one side surface (a surface on which the R light source 41r is disposed) of the housing unit 40a in the direction of gravitational force in the use state; and a mark portion 64 that is formed on the other side surface of the housing unit 40a in the direction of gravitational force in the use state.

The mark portion 61 is a region on which a text of "Right" is printed.

The mark portion 62 is a region on which a text of "Left" is printed.

The mark portion 63 is a region on which a text of "Up" is printed. The mark portion 63 is a mark for identifying a position where the R light source 41r is disposed on the housing unit 40a.

The mark portion 64 is a region on which a text of "Down" is printed.

When an operator incorporates the display unit 4 shown in FIG. 7 into the vehicle using the right-side steering wheel, the display unit 4 is disposed such that the mark portion 61 and the mark portion 63 are placed on the upper side in the direction of gravitational force. Further, when an operator incorporates the display unit 4 shown in FIG. 7 into the vehicle using the left-side steering wheel, the display unit 4 is disposed such that the mark portion 62 and the mark portion 63 are placed on the upper side in the direction of gravitational force.

In such a manner, an operator is able to easily set the display unit 4 in an optimum state for the vehicle using the right-side steering wheel and the vehicle using the left-side steering wheel by using the mark portions 61 to 64. Accordingly, it is possible to improve a work efficiency when the HUD is incorporated into the vehicle. Further, it is possible to prevent error in installation of the display unit 4 from occurring.

Figure 8:
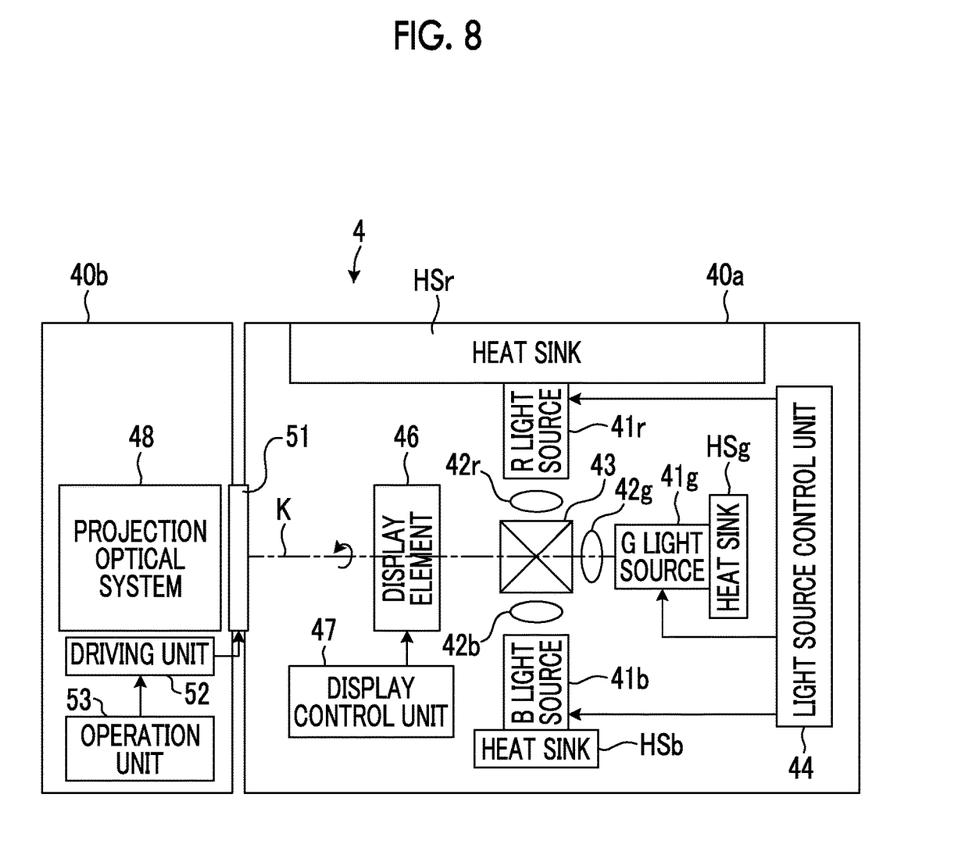
FIG. 8 is a diagram illustrating another modification example of the display unit 4 shown in FIG. 5.

FIG. 8 is a diagram illustrating another modification example of the display unit 4 shown in FIG. 5.

A configuration of the display unit 4 shown in FIG. 8 is the same as the configuration shown in FIG. 5 except that the housing unit 40b further houses a driving unit 52 and an operation unit 53.

The driving unit 52 is an actuator that drives the rotation mechanism 51.

The operation unit 53 includes, for example, buttons and the like. The buttons include: an R button for giving an instruction for setting a state of the housing unit 40a of the display unit 4 for the vehicle using the right-side steering wheel; and an L button for giving an instruction for setting a state of the housing unit 40*a* of the display unit 4 for the vehicle using the left-side steering wheel.

If an operator presses the R button, a rotation command signal for the right-side steering wheel is input to the driving unit 52. If the rotation command signal is input, the driving unit 52 rotates the rotation mechanism 51, and achieves the state shown in FIG. 8.

If an operator presses the L button, a rotation command signal for the left-side steering wheel is input to the driving unit 52. If the rotation command signal is input, the driving unit 52 rotates the rotation mechanism 51, and changes the state shown in FIG. 8 to a state where the housing unit 40*a* is rotated around the optical axis K by 180 degrees.

In such a manner, the driving unit 52 that drives the rotation mechanism 51 is provided in the display unit 4. Thereby, it is possible to efficiently and accurately incorporate the HUD into the vehicle.

Further, it is not necessary to switch the firmware between the vehicle using the right-side steering wheel and the vehicle using the left-side steering wheel, and thus it is possible to reduce costs of manufacturing of the HUD.

In addition, in the display unit 4 shown in FIGS. 5, 7, and 8, it is preferable that, after the HUD has been completely incorporated into the vehicle, the rotation mechanism 51 has a locking mechanism for fixing the position of the housing unit 40*a* so as not to rotate the housing unit 40*a* around the optical axis K.

In the above description, the number of light sources included in the display unit 4 is set to three, the number of light sources may be two, or four or more. Further, the R light source 41*r* is an example of a light source having a largest change in the light emission intensity relative to the change in temperature. In accordance with the light emitting element, the light source may be formed as the G light source 41*g* or the B light source 41*b*.

The HUD shown in FIG. 1 employs a field sequential method of performing image display by emitting red light, green light, and blue light in a time-division manner. However, the image display method is not limited to this, and a known method may be used.

As described above, the present description discloses the following items.

A disclosed projection-type display device comprises: a plurality of light sources that emit light beams with different colors; a projection unit that projects light beams based on image information among light beams emitted from the plurality of light sources onto a projection screen; a first radiation member that radiates heat generated from a first light source, which has a maximum change in light emission intensity relative to a change in temperature, among the plurality of light sources; and a second radiation member that radiates heat generated from a second light source, which is other than the first light source, among the plurality of light sources and that has a surface area smaller than that of the first radiation member. In a use state, the first light source is disposed on a side apart from the second light source in a direction opposite to a direction of gravitational force.

The disclosed projection-type display device further comprises an optical member that guides the light beams, which are emitted from the plurality of light sources, into a same optical path, a housing unit that houses the plurality of light sources and the optical member, and a rotation mechanism that rotates the housing unit around an optical axis of the optical member.

In the disclosed projection-type display device, the plurality of light sources include a red light source that emits red light beams, a green light source that emits green light beams, and a blue light source that emits blue light beams, and the first light source is the red light source.

In the disclosed projection-type display device, the plurality of light sources include a red light source that emits red light beams, a green light source that emits green light beams, and a blue light source that emits blue light beams, the first light source is the red light source, the red light source and the blue light source are disposed with the optical member interposed therebetween, and the green light source is disposed on a side opposite to a light emission side of the optical member.

In the disclosed projection-type display device, the rotation mechanism has a locking mechanism that fixes a position of the housing unit.

The disclosed projection-type display device further comprises a driving unit that drives the rotation mechanism.

In the disclosed projection-type display device, a mark for identifying a position of the first light source is formed on the housing unit.

The disclosed projection-type display device further comprises a cooling unit that cools down the first light source and is provided at a position opposed to the first light source, or a cooling unit that cools down the first radiation member and is provided at a position opposed to the first radiation member.

The disclosed projection-type display device is incorporated into a vehicle to be used.

A heat dissipation method of the disclosed projection-type display device is a heat dissipation method of a projection-type display device having a plurality of light sources that emit light beams with different colors, and a projection unit that projects light beams based on image information among light beams emitted from the plurality of light sources onto a projection screen. The method comprises: causing the plurality of light sources to include a first light source, which has a maximum change in light emission intensity relative to a change in temperature, and a second light source which is other than the first light source, providing the first light source on a side apart from the second light source in a direction opposite to a direction of gravitational force in a use state, radiating heat, which is generated from the first light source, through a first radiation member, and radiating heat, which is generated from the second light source, through a second radiation member which has a surface area smaller than that of the first radiation member.

In the heat dissipation method of the disclosed projection-type display device, the projection-type display device further comprises an optical member that guides the light beams, which are emitted from the plurality of light sources, into a same optical path, a housing unit that houses the plurality of light sources and the optical member, and a rotation mechanism that rotates the housing unit around an optical axis of the optical member.

In the heat dissipation method of the disclosed projection-type display device, the plurality of light sources include a red light source that emits red light beams, a green light source that emits green light beams, and a blue light source that emits blue light beams, and the first light source is the red light source.

In the heat dissipation method of the disclosed projection-type display device, the plurality of light sources include a red light source that emits red light beams, a green light source that emits green light beams, and a blue light source that emits blue light beams, the first light source is the red light source, the red light source and the blue light source are disposed with the optical member interposed therebetween, and the green light source is disposed on a side opposite to a light emission side of the optical member.

In the heat dissipation method of the disclosed projection-type display device, the rotation mechanism has a locking mechanism that fixes a position of the housing unit.

In the heat dissipation method of the disclosed projection-type display device, the projection-type display device further comprises a driving unit that drives the rotation mechanism.

In the heat dissipation method of the disclosed projection-type display device, a mark for identifying a position of the first light source is formed on the housing unit.

In the heat dissipation method of the disclosed projection-type display device, the projection-type display device further comprises a cooling unit that cools down the first light source and is provided at a position opposed to the first light source, or a cooling unit that cools down the first radiation member and is provided at a position opposed to the first radiation member.

The present invention is applied to particularly an on-board HUD, and is thus convenient and effective.

The present invention has been described in detail with reference to specific embodiments. However, it is apparent to those skilled in the art that various modifications variations may be made without departing from the technical spirit and scope of the invention.

The present application is based on Japanese Patent Application (JP2014-197215A) filed on Sep. 26, 2014, the content of which is incorporated herein by reference.

EXPLANATION OF REFERENCES

1: front glass
2: combiner
4: display unit
5: diffuser plate
6: reflection mirror
7: magnifying glass
40: casing
41r: R light source
41g: G light source
41b: B light source
HSr, HSg, HSb: heat sink

What is claimed is:

1. A projection-type display device which is used in a state of being incorporated into a dashboard of a vehicle and comprises:
a plurality of light sources that emit light beams with different colors;
a projection unit that projects light beams based on image information among light beams emitted from the plurality of light sources onto a projection screen;
a first radiation member that radiates heat generated from a first light source, which has a maximum change in light emission intensity relative to a change in temperature, among the plurality of light sources; and
a second radiation member that radiates heat generated from a second light source, which is other than the first light source, among the plurality of light sources and that has a surface area smaller than that of the first radiation member,
wherein in a use state, the first light source and the first radiation member are disposed on a side apart from the second light source in a direction opposite to a direction of gravitational force,
only an opening portion is provided at a position to face toward the first radiation member in a casing that houses the plurality of light sources, the first radiation member and the second radiation member, in which a heat is discharged to an outside from the casing through the opening portion, and
a part by which a heat is discharged to an outside from the casing is provided only to the first radiation member among the first radiation member and the second radiation member, the part comprising the opening portion.

2. The projection-type display device according to claim 1, further comprising:
an optical member that guides the light beams, which are emitted from the plurality of light sources, into a same optical path; and
a housing unit that houses the plurality of light sources and the optical member and is provided to be rotatable around an optical axis of the optical member.

3. The projection-type display device according to claim 1,
wherein the plurality of light sources include a red light source that emits red light beams, a green light source that emits green light beams, and a blue light source that emits blue light beams, and
wherein the first light source is the red light source.

4. The projection-type display device according to claim 2,
wherein the plurality of light sources include a red light source that emits red light beams, a green light source that emits green light beams, and a blue light source that emits blue light beams,
wherein the first light source is the red light source,
wherein the red light source and the blue light source are disposed with the optical member interposed therebetween, and
wherein the green light source is disposed on a side opposite to a light emission side of the optical member.

5. The projection-type display device according to claim 2,
wherein the housing unit is provided to be capable of fixing a rotational position of the housing unit around the optical axis of the optical member.

6. The projection-type display device according to claim 2, further comprising
an actuator that drives so that the housing unit is rotated around the optical axis of the optical member.

7. The projection-type display device according to claim 2,
wherein a mark for identifying a position of the first light source is formed on the housing unit.

8. A heat dissipation method of a projection-type display device which is used in a state of being incorporated into a dashboard of a vehicle and has a plurality of light sources that emit light beams with different colors, and a projection unit that projects light beams based on image information among light beams emitted from the plurality of light sources onto a projection screen, the method comprising:
causing the plurality of light sources to include a first light source, which has a maximum change in light emission intensity relative to a change in temperature, and a second light source which is other than the first light source,
providing the first light source and a first radiation member for radiating heat which is generated from the first light source on a side apart from the second light source in a direction opposite to a direction of gravitational force in a use state, and radiating heat, which is generated from the second light source, through a second radiation member which has a surface area smaller than that of the first radiation member, wherein only an opening portion is provided at a position to face toward the first radiation member in a casing that houses the plurality of light sources, the first radiation member and the second radiation member, in which a heat is discharged to an outside from the casing through the opening portion, and a part by which a heat is discharged to an outside from the casing is provided only to the first radiation member among the first radiation member and the second radiation member, the part comprising the opening portion, and a heat is discharged to an outside from the casing through the opening portion.

9. The heat dissipation method according to claim 8, wherein the projection-type display device further comprises an optical member that guides the light beams, which are emitted from the plurality of light sources, into a same optical path, a housing unit that houses the plurality of light sources and the optical member and is provided to be rotatable around an optical axis of the optical member.

10. The heat dissipation method according to claim 8, wherein the plurality of light sources include a red light source that emits red light beams, a green light source that emits green light beams, and a blue light source that emits blue light beams, and wherein the first light source is the red light source.

11. The heat dissipation method according to claim 9, wherein the plurality of light sources include a red light source that emits red light beams, a green light source that emits green light beams, and a blue light source that emits blue light beams, wherein the first light source is the red light source, wherein the red light source and the blue light source are disposed with the optical member interposed therebetween, and wherein the green light source is disposed on a side opposite to a light emission side of the optical member.

12. The heat dissipation method according to claim 9, wherein the housing unit is provided to be capable of fixing a rotational position of the housing unit around the optical axis of the optical member.

13. The heat dissipation method according to claim 9, wherein the projection-type display device further comprises an actuator that drives so that the housing unit is rotated around the optical axis of the optical member.

14. The heat dissipation method according to claim 9, wherein a mark for identifying a position of the first light source is formed on the housing unit.

\* \* \* \* \*